US012658208B2

(12) United States Patent
Ruiz et al.

(10) Patent No.: US 12,658,208 B2
(45) Date of Patent: Jun. 16, 2026

(54) NON-CONTACT TAPE HEAD

(71) Applicant: Western Digital Technologies, Inc., San Jose, CA (US)

(72) Inventors: Oscar J. Ruiz, San Jose, CA (US); Kenji Kuroki, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/974,290

(22) Filed: Dec. 9, 2024

(65) Prior Publication Data

US 2026/0162676 A1 Jun. 11, 2026

(51) Int. Cl.
G11B 5/60 (2006.01)
G11B 5/008 (2006.01)

(52) U.S. Cl.
CPC ........ G11B 5/6082 (2013.01); G11B 5/00826 (2013.01)

(58) Field of Classification Search
None
See application file for complete search history.

(56) References Cited

U.S. PATENT DOCUMENTS

| | | | | |
|---|---|---|---|---|
| 3,947,887 | A * | 3/1976 | Platter | G11B 5/1871 |
| | | | | 29/603.12 |
| 5,774,306 | A * | 6/1998 | Wang | G11B 5/10 |
| 6,341,416 | B1 * | 1/2002 | Biskeborn | G11B 5/255 |
| 8,373,944 | B2 | 2/2013 | Biskeborn | |
| 9,030,779 | B2 * | 5/2015 | Dellmann | G11B 5/3106 |
| | | | | 360/130.21 |
| 9,691,414 | B1 * | 6/2017 | Biskeborn | G11B 5/3169 |
| 9,734,849 | B2 | 8/2017 | Biskeborn | |
| 9,734,854 | B2 | 8/2017 | Engelen et al. | |
| 10,657,989 | B1 | 5/2020 | Biskeborn et al. | |
| 11,495,254 | B2 | 11/2022 | Kuroki et al. | |
| 2004/0012876 | A1 | 1/2004 | Tahara | |
| 2012/0300338 | A1 * | 11/2012 | Biskeborn | G11B 5/60 |
| | | | | 360/75 |
| 2013/0148238 | A1 | 6/2013 | Ellis et al. | |
| 2014/0320993 | A1 | 10/2014 | Dellmann et al. | |

(Continued)

OTHER PUBLICATIONS

International Search Report and Written Opinion dated Oct. 27, 2025 for Application No. PCT/US2025/034214.

(Continued)

*Primary Examiner* — William J Klimowicz
(74) *Attorney, Agent, or Firm* — Patterson + Sheridan, LLP

(57) ABSTRACT

The present disclosure generally relate to a tape drive including a tape head assembly comprising a tape head. The tape head assembly further comprises a substrate having a leading edge (LE), a trailing edge (TE), and a first media facing surface (MFS) disposed between the leading and trailing edges, and a recession disposed in the substrate, the recession being recessed from the first MFS. The tape head is disposed in the recession. The tape head has a second MFS that extends above the first MFS by a distance of about 20 nm to about 200 nm. The LE comprising a first step and a second step. The first and second steps, the recession, and the extended tape head enable a tape of the tape drive to be spaced from the substrate and tape head as the tape moves over the tape head assembly during operation.

21 Claims, 7 Drawing Sheets

(56)     References Cited

U.S. PATENT DOCUMENTS

| | | | | |
|---|---|---|---|---|
| 2015/0364154 | A1* | 12/2015 | Holmberg | G11B 15/62 |
| | | | | 360/90 |
| 2017/0236535 | A1* | 8/2017 | Biskeborn | G11B 5/29 |
| | | | | 360/125.33 |
| 2019/0341071 | A1* | 11/2019 | Biskeborn | G11B 5/1871 |
| 2022/0059128 | A1* | 2/2022 | Ruiz | G11B 5/00813 |
| 2023/0087767 | A1* | 3/2023 | Ruiz | G11B 5/2655 |
| | | | | 360/236.5 |
| 2023/0223045 | A1 | 7/2023 | Kaddeche et al. | |
| 2024/0185883 | A1* | 6/2024 | Morita | G11B 5/4893 |
| 2025/0140283 | A1 | 5/2025 | Ruiz et al. | |

OTHER PUBLICATIONS

Biskeborn, R. G. et al., "Flat-profile tape recording head", IEEE Transactions on Magnetics, vol. 38, Sep. 2002, pp. 1-3, <https://doi.org/10.1109/TMAG.2002.802810>.

* cited by examiner

NON-CONTACT TAPE HEAD

BACKGROUND OF THE DISCLOSURE

Field of the Disclosure

Embodiments of the present disclosure generally relate to a tape drive including a tape head.

Description of the Related Art

Tape data storage is a system for storing digital information on magnetic tape using digital recording. Tape storage media is more commonly packaged in cartridges. A tape drive performs writing or reading of data in the cartridges. A common cartridge-based format is LTO, which comes in a variety of recording densities.

Tape drives operate by using a tape head (i.e., magnetic recording head) to record and read back information from tapes by magnetic processes. The tape head comprises servo elements and data elements that are arranged in an array that is oftentimes referred to as a tape head array. Tape drives also have motors and rollers to move the tape over the magnetic head.

In operation, the tape drive system applies a tension to the magnetic tape and moves it at a constant velocity between two reels. In between the two reels, the tape rolls over numerous rollers guiding the tape to the front of the head to be read or written. When the tape comes into contact with the tape head, the tape may experience contact stress and friction that may result in the wear and tear of the tape, resulting in decreased lifespan and lower reliability.

Therefore, there is a need in the art for an improved tape head that reduces the contact stress between the tape and the head while at the same time ensures the spacing between the tape and the tape head is small for adequate magnetic performance.

SUMMARY OF THE DISCLOSURE

The present disclosure generally relates to a tape drive including a tape head assembly comprising a tape head. The tape head assembly further comprises a substrate having a leading edge (LE), a trailing edge (TE), and a first media facing surface (MFS) disposed between the leading and trailing edges, and a recession disposed in the substrate, the recession being recessed from the first MFS. The tape head is disposed in the recession but may extend outside of the recession. The tape head has a second MFS that extends above the first MFS by a distance of about 20 nm to about 200 nm. The LE comprises a first step and a second step. The first and second steps, the recession, and the extended tape head enable a tape of the tape drive to be spaced from the substrate and tape head as the tape moves over the tape head assembly during operation. An air bearing forms between the tape head and the moving tape. The pressure of the air bearing combined with the bending stiffness of the tape and the tape tension keep the tape from making contact with the tape head.

In one embodiment, a tape head assembly comprises a substrate, the substrate having a leading edge, a trailing edge, and a first media facing surface (MFS) disposed between the leading edge and the trailing edge, a recession disposed in the substrate, the recession being recessed from the first MFS, a tape head disposed in the recession, the tape head comprising a plurality of data elements, wherein a second MFS of the tape head extends above the first MFS a distance of about 20 nm to about 200 nm, and a first step disposed in the leading edge.

In another embodiment, a tape head assembly comprises a substrate, the substrate having a leading edge, a trailing edge, and a first media facing surface (MFS) disposed between the leading edge and the trailing edge, a first recession disposed in the substrate, the first recession being recessed a distance of about 10 nm to about 100 nm from the first MFS, a first tape head disposed in the first recession, the first tape head comprising a first plurality of data elements, wherein a second MFS of the first tape head extends above the first MFS a distance of about 20 nm to about 200 nm, a first step disposed in the leading edge, the first step comprising a first surface extending in a first direction perpendicular to the first MFS, a second surface extending in a second direction parallel to the MFS, and a third surface extending in the first direction, and a second step disposed adjacent to the first step in the leading edge, the second step comprising the third surface, a fourth surface extending in the second direction, and a fifth surface extending in the first direction, wherein the fifth surface extends to the first MFS.

In yet another embodiment, a tape drive comprises a tape, a tape head assembly, the tape head assembly comprising: a substrate, the substrate having a leading edge, a trailing edge, and a first media facing surface (MFS) disposed between the leading edge and the trailing edge, a recession disposed in the substrate, the recession being recessed from the first MFS, the recession being recessed a distance of about 10 nm to about 100 nm from the first MFS, a tape head disposed in the recession, the tape head comprising a plurality of data elements, wherein a second MFS of the tape head extends above the first MFS a distance of about 20 nm to about 200 nm, a first step disposed in the leading edge, the first step having a width to depth ratio of about 10 to 100, and a second step disposed adjacent to the first step in the leading edge, the second step having a width to depth ratio of about 10 to 100, and a controller configured to move the tape over the tape head and to control the plurality of data elements to write data to and read data from the tape, wherein the tape is spaced from the first MFS a distance of about 100 nm to about 250 nm as the tape is moved over the tape head assembly, and wherein the tape is spaced from the second MFS a distance of about 10 nm to about 30 nm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive including a tape head assembly comprising a tape head. The tape head assembly further comprises a substrate having a leading edge (LE), a trailing edge (TE), and a first media facing surface (MFS) disposed between the leading and trailing edges, and a recession disposed in the substrate, the recession being recessed from the first MFS. The tape head is disposed in the recession. The tape head has a second MFS that extends above the first MFS by a distance of about 20 nm to about 200 nm. The LE comprises a first step and a second step. The first and second steps, the recession, and the extended tape head enable a tape of the tape drive to be spaced from the substrate and tape head as the tape moves over the tape head assembly during operation.

Figure 1A:
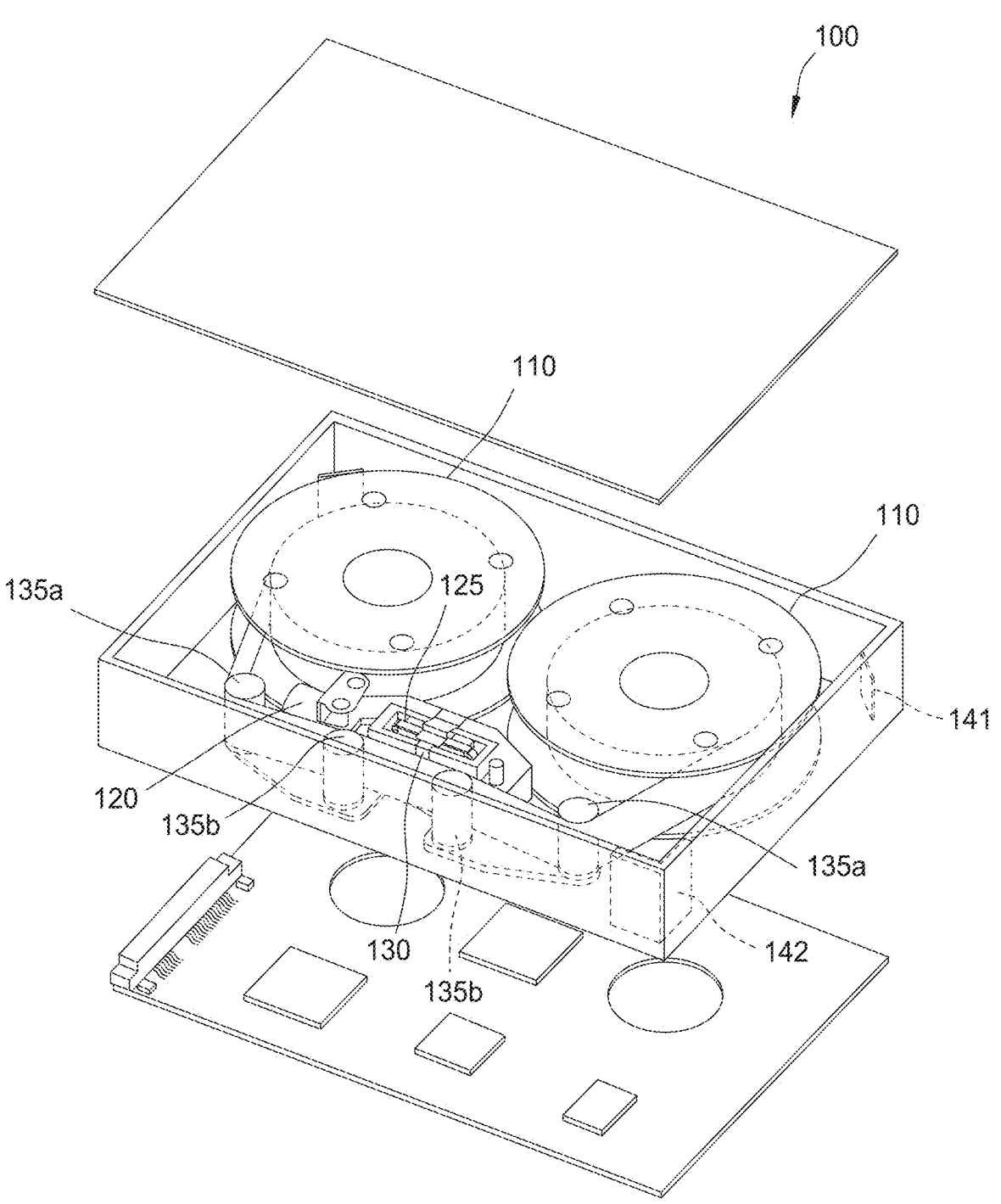
FIGS. 1A-1C illustrate a perspective exploded view, a simplified top down, and side profile view of a tape drive, in accordance with some embodiments.
Figure 1B:
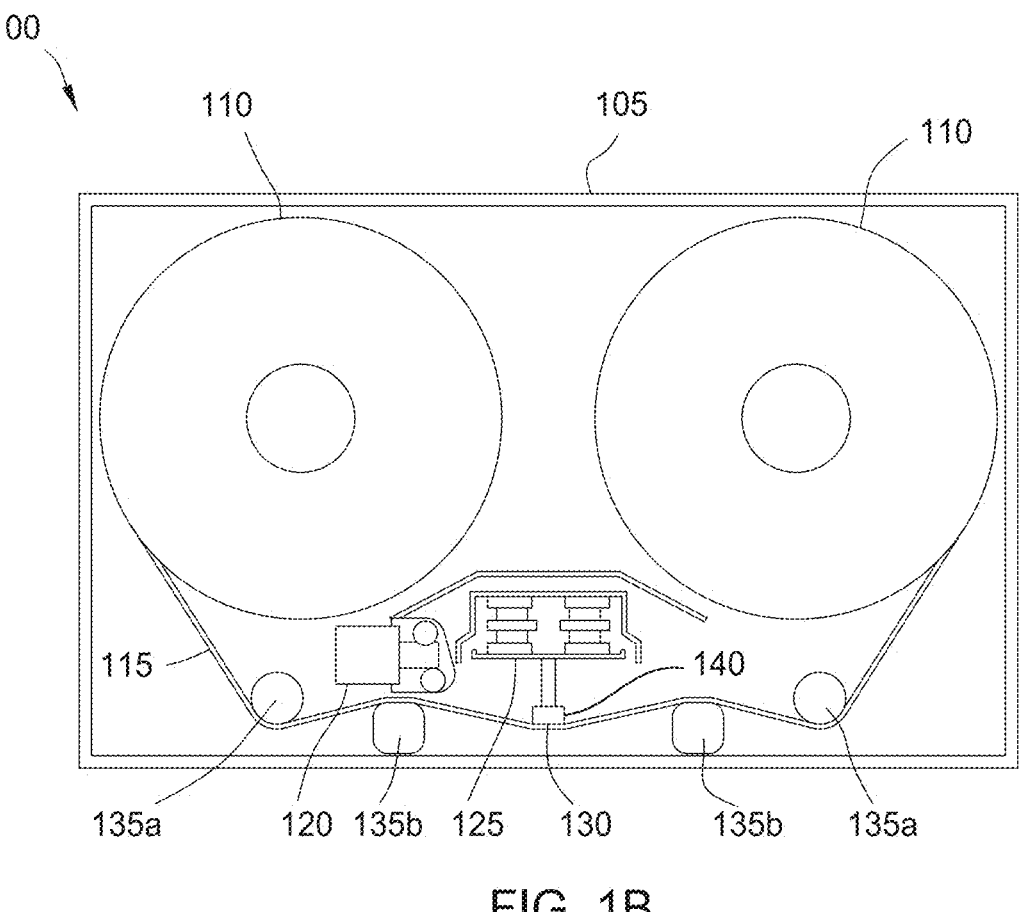
Figure 1C:
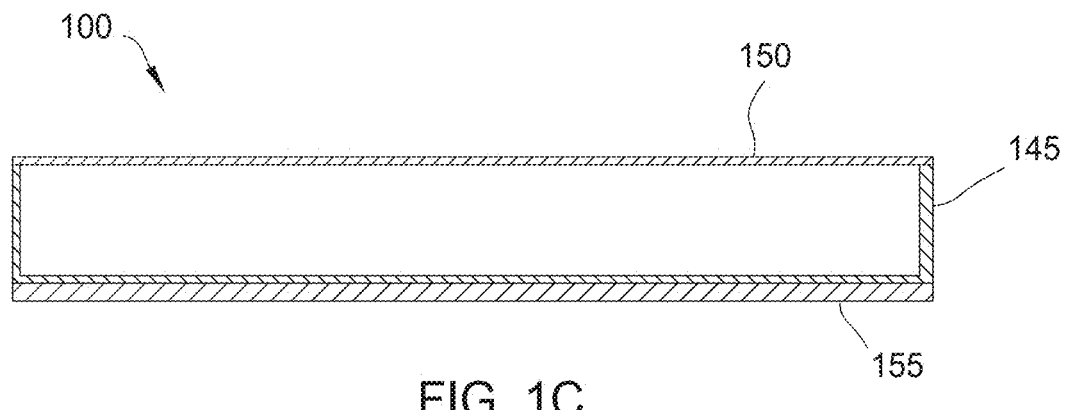

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a controller 140, a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. The drive 100 may instead be a tape drive configured to accept and access magnetic media or tape media 115 from an insertable cartridge (e.g., an LTO drive), where the insertable cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115 and provides its extensional and bending stiffness.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130. The tape media 115 is pressed against the head assembly 130 by virtue of the tension applied to the tape.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip. The rollers may have grooves on their surface to prevent axial displacement of the tape.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

Figure 2:
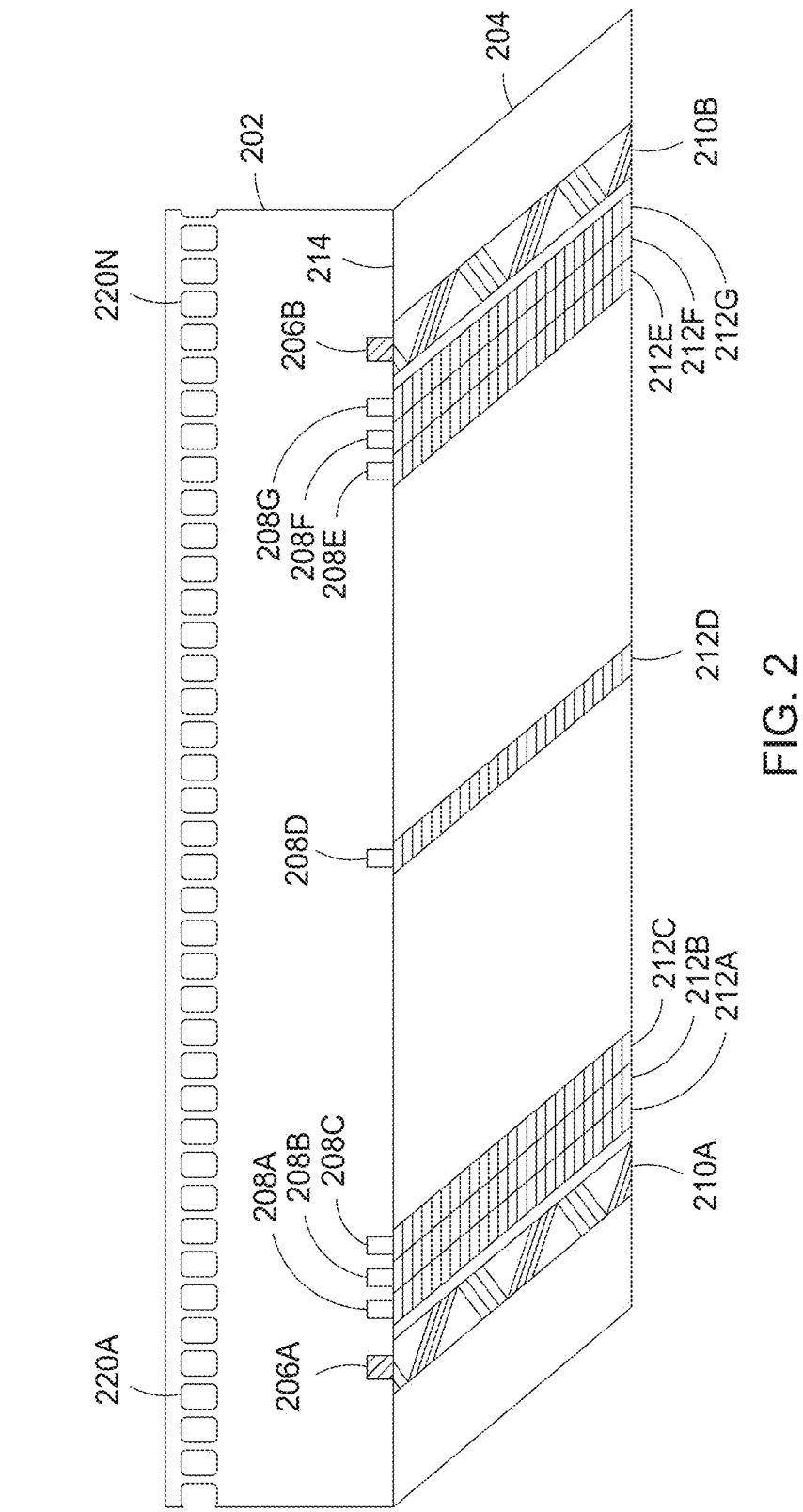
FIG. 2 is a schematic illustration of a tape head and tape that are aligned.

The controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below. FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212G for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
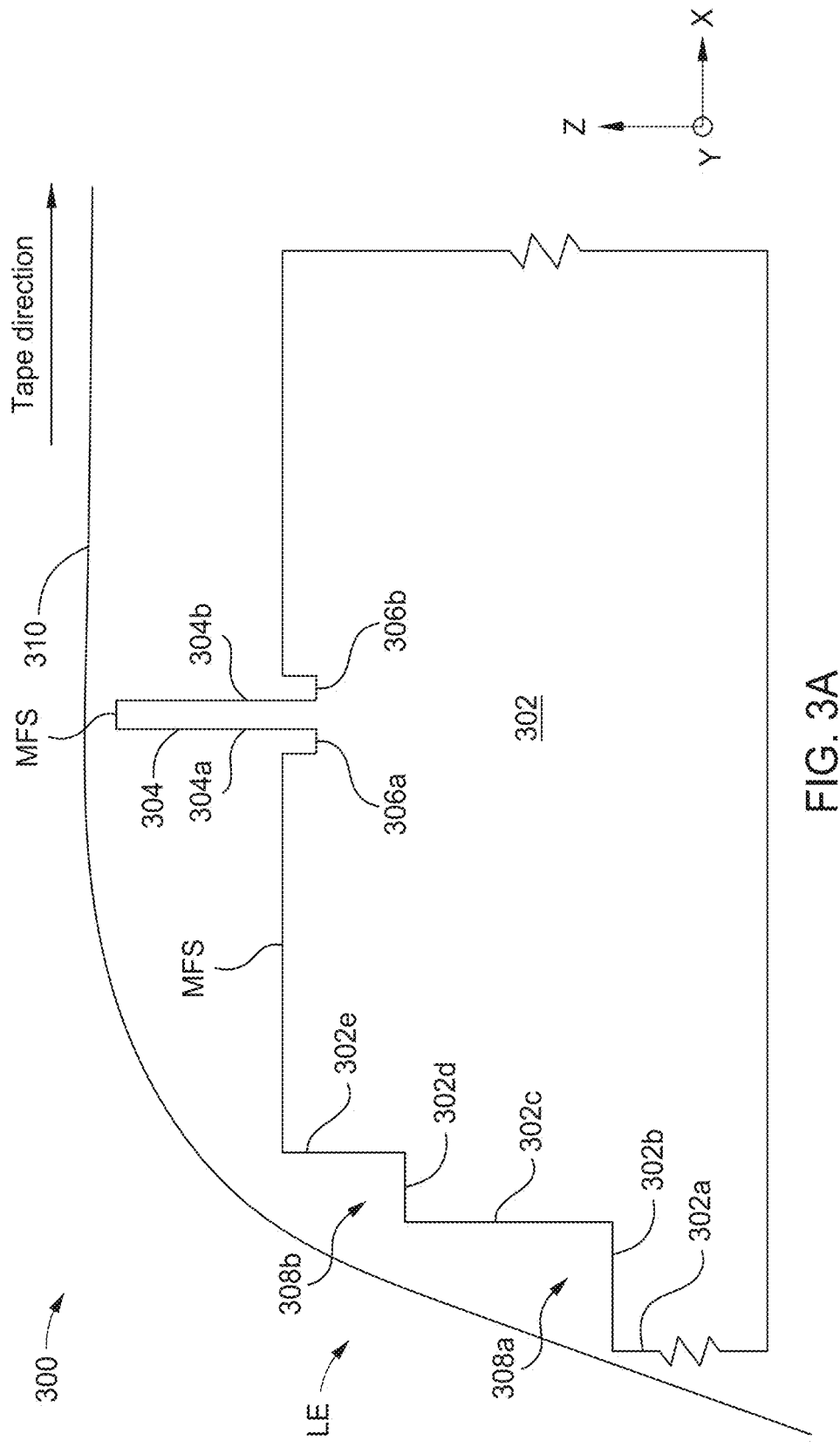
FIG. 3A illustrates a cross-sectional view of a tape head assembly along the direction of tape motion through the head centerline.
Figure 3B:
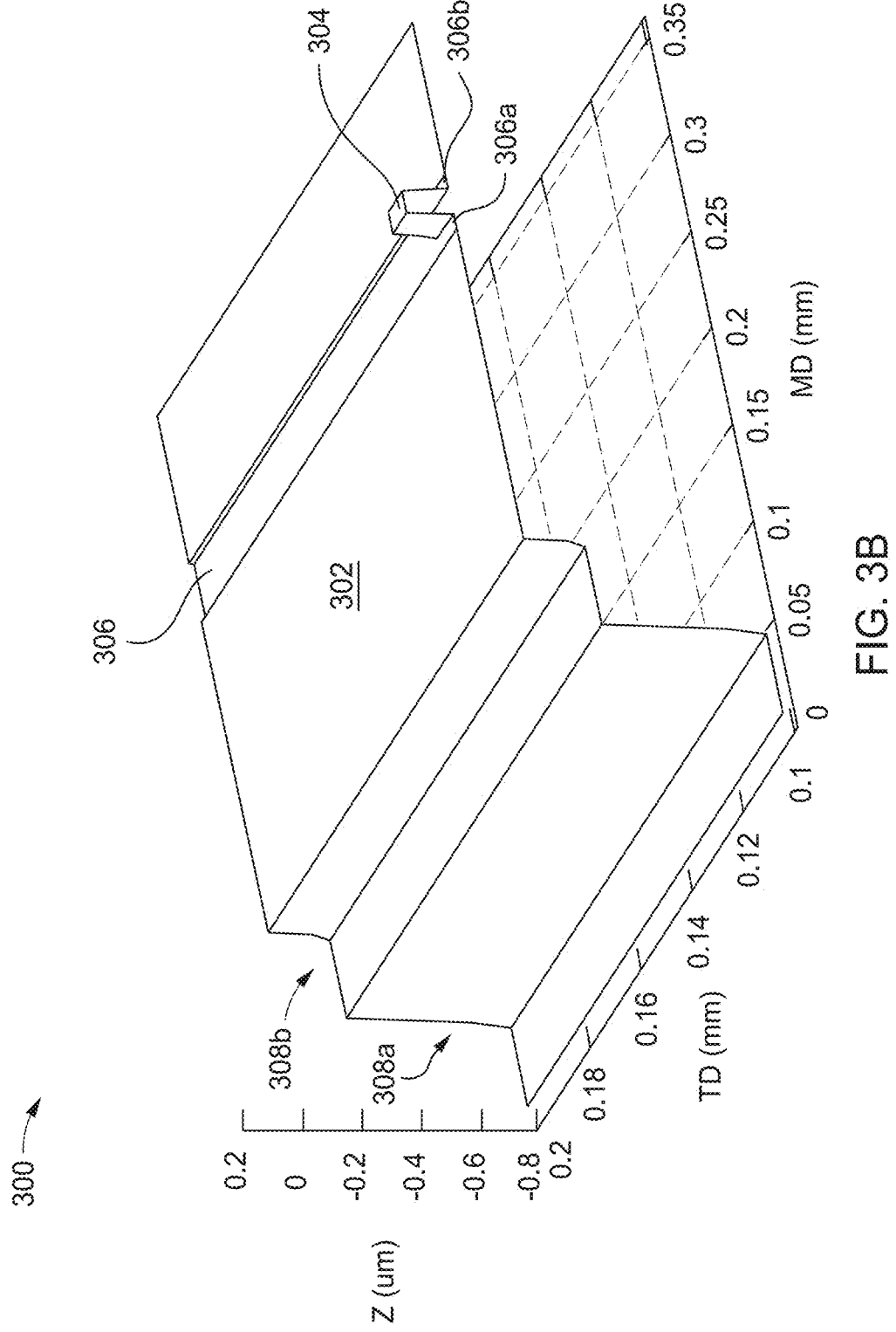
FIG. 3B is a perspective view of the left half of the same head, according to one embodiment.

FIGS. 3A-3B illustrate a cross-sectional view of a tape head assembly 300, according to one embodiment. FIG. 3A illustrates a cross-sectional view of a tape head assembly along the direction of tape motion through the head centerline. The vertical distance between the tape and head is called the clearance. FIG. 3B illustrates a perspective view of one half of the tape head assembly 300. The tape head assembly 300 may be a part of the tape drive 100 of FIGS. 1A-1C, and/or a part of the tape head module 200 of FIG. 2. FIGS. 3A-3B may not be shown to scale.

The tape head assembly 300 comprises a substrate 302 and one or more tape heads 304 (one shown) disposed on a media facing surface (MFS) of the substrate 302. The substrate 302 may comprise a closure (not shown). The tape head 304 comprises a plurality of data heads (not shown), such as write heads, read heads, and/or servo read heads. For example, the tape head 304 may comprise the servo heads 206A, 206B and/or the data heads 208A-208G of FIG. 2. The data heads are configured to write data to and read data from the tape 310. The tape head 304 has a width in the x-direction of about 5 μm to about 30 μm. The tape head 304 extends above the MFS of the substrate 302 in the z-direction a distance of about 20 nm to about 200 nm. Thus, the MFS of the tape head 304 is higher than the MFS of the substrate 302 by a distance of about 20 nm to about 200 nm.

The tape head assembly 300 comprises a first recession 306a disposed adjacent to a first surface 304a of the tape head 304 and a second recession 306b disposed adjacent to a second surface 304b of the tape head 304. The tape head 304 is disposed in the recessions 306a, 306b but may extend outside of the recessions 306a, 306b. The first and second recessions 306a, 306b extend below the MFS of the substrate 302 in the −z-direction a distance of about 10 nm to about 100 nm. The first and second recessions 306a, 306b have a width in the x-direction of about 0 μm to about 10 μm. As shown in FIG. 3B, the first and second recessions 306a, 306b merge at the ends of the tape head 304 to form one recession 306. The recession 306 has a total width in the x-direction of about 30 μm to about 40 μm, which can be greater, equal or smaller than a width of the tape head 304 in the x-direction. As such, the first and second recessions 306a, 306b may be collectively referred to herein as the recession 306.

The leading edge (LE) of the substrate 302 comprises a first step 308a and a second step 308b. The first step 308a is formed by a first surface 302a of the substrate 302 extending in the z-direction a distance of about 1 mm, a second surface 302b of the substrate 302 extending in the x-direction a distance of about 25 μm to about 100 μm, and a third surface 302c of the substrate 302 extending in the z-direction a distance of about 100 nm to about 1000 nm, such as about 1000 nm. The second step 308b is formed by the third surface 302c extending in the z-direction, a fourth surface 302d of the substrate 302 extending in the x-direction a distance of about 25 μm to about 100 μm, and a fifth surface 302e of the substrate 302 extending in the z-direction a distance of about 100 nm to about 2000 nm. The fifth surface 302e extends to the MFS of the substrate 302.

In other words, the first step 308a has a depth in the z-direction of about 0.5 μm and a width in the x-direction of about 40 μm. The first step 308a has a width to depth ratio of about 10 to 100, such as about 80. The second step 308b has a depth in the z-direction of about 1 μm and a width in the x-direction of about 40 μm. The second step 308b has a width to depth ratio of about 10 to 100, such as about 40.

During operation, as the tape 310 moves over the substrate 302 and tape head 304 via a controller (such as the controller 140 of FIG. 1A), air pressurizes at the first and second steps 308a, 308b, causing the tape 310 to raise over the steps 308a, 308b and the tape head 304 to prevent the tape 310 from contacting the steps 308a, 308b and the tape head 304. The first and second steps 308a, 308b, the recession 306, and the extended tape head 304 enable a tape 310 to be spaced from the substrate 302 and tape head 304 as the tape 310 moves over the tape head assembly 300 during operation. An air bearing forms between the tape head 304 and the moving tape 310. The pressure of the air bearing keeps the tape 310 from making contact with the tape head 304.

The tape 310 may be spaced from the MFS of the tape head 304 a distance of about 10 nm to about 30 nm, and spaced from the MFS of the substrate 302 by a distance of about 50 nm to about 250 nm. The tape head 304 is able to continue to write data to and read data from the tape 310. Because the tape 310 is spaced from the substrate 302 and the tape head 304, the tape 310 is not damaged by corners of the substrate 302 by wear and friction. There may be slight contact due to the roughness on the surface of the tape head 304 and the tape 310. As such, the reliability of the tape 310 is greatly improved while at the same time a proper clearance is realized at the head 304. Moreover, the lifetime and reliability of the tape 310 and head 304 are extended.

Figure 4:
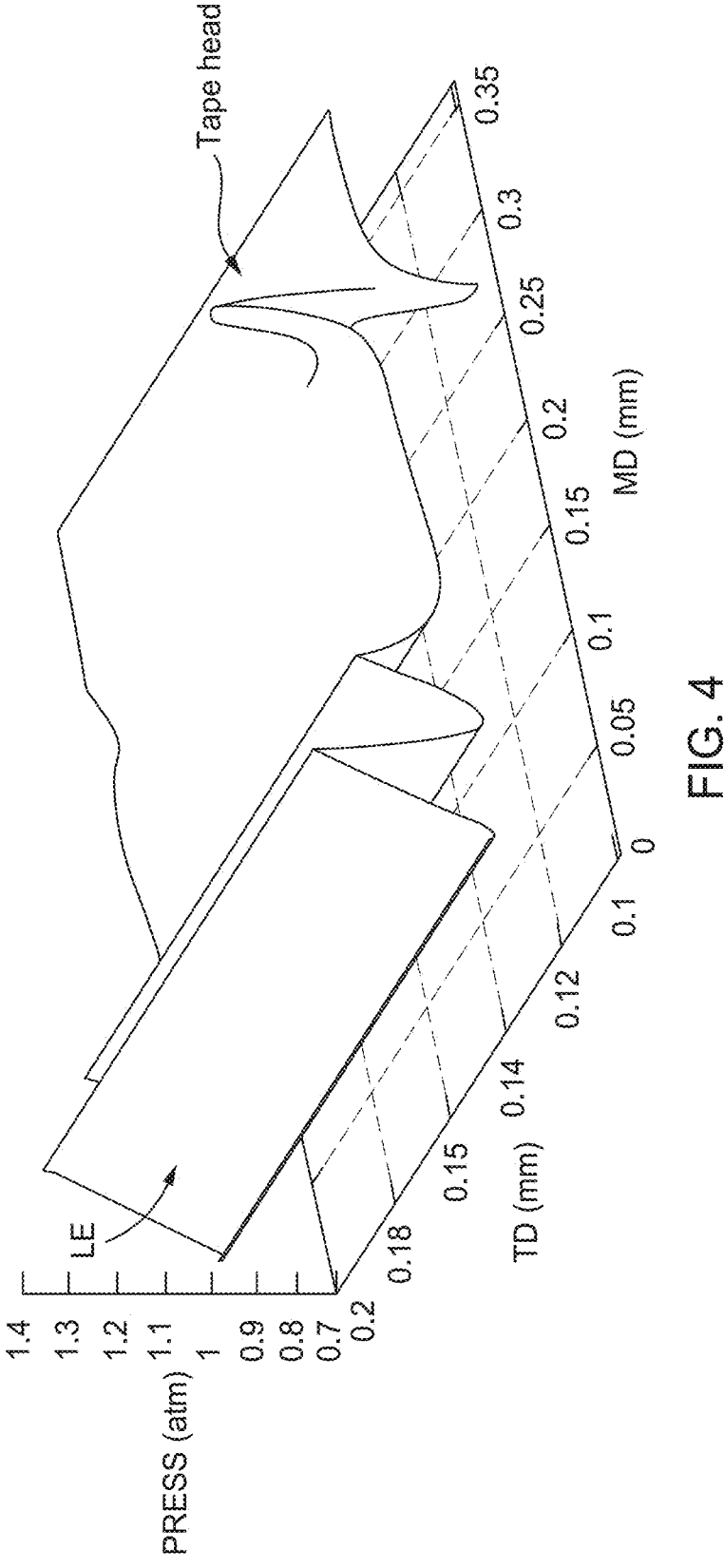
FIG. 4 illustrates the air bearing pressure that forms between the surface of the head and moving tape shown in FIGS. 3A-3B, according to one embodiment.

FIG. 4 illustrates a graph 400 showing the air bearing pressure at the MFS of the tape assembly 300 of FIGS. 3A-3B as a tape 310 moves over the tape head assembly 300, according to one embodiment.

As shown by the graph 400, as the tape 310 moves over the first and second steps 308a, 308b, the pressure at the MFS is increased, causing the tape 310 to raise over the steps 308a, 308b. The pressure then lowers as the tape 310 moves over the MFS of the substrate 302 before increasing once again due to the recession(s) 306, causing the tape 310 to move over the tape head 304 and making light contact with the tape head 304. Such light contact stems from the interaction of the surface roughness of the tape 310 and the tape head 304. The ensuing contact pressure reduces with smoother roughness. The pressure then lowers once again as the tape 310 continues to move over the MFS of the substrate 302.

Figure 5:
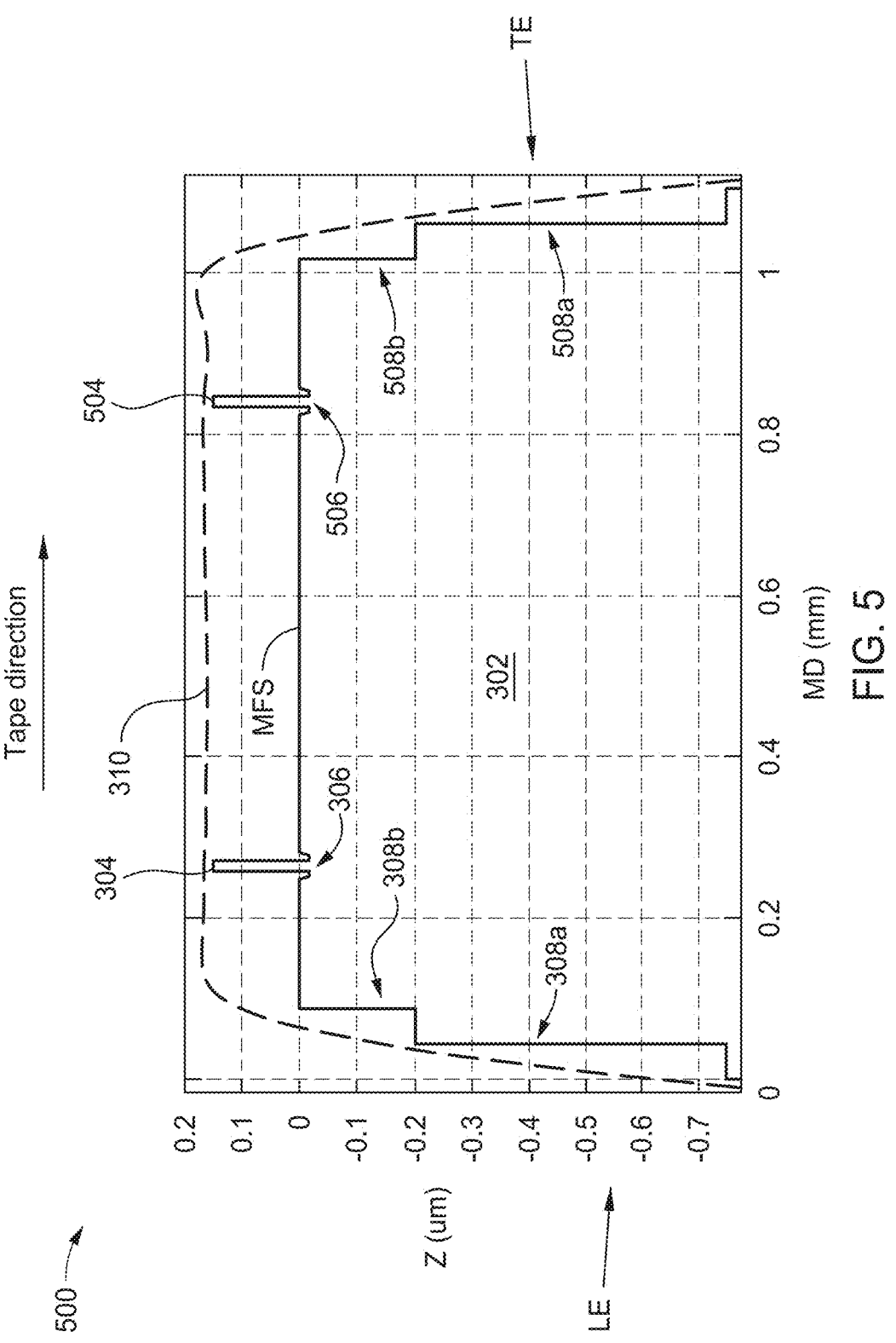
FIG. 5 illustrates a cross-sectional view of a tape head assembly, showing the clearance, according to another embodiment. The tape is under tension and possesses extensional and bending stiffness. The bending stiffness limits the curvature of the tape bending.

FIG. 5 illustrates a cross-sectional view of a tape head assembly 500, according to another embodiment. The tape head assembly 500 may be a part of the tape drive 100 of FIGS. 1A-1C, and/or the tape head module 200 of FIG. 2. Aspects of FIG. 5 may be used in combination with FIGS. 3A-3B.

The tape head assembly 500 is similar to the tape head assembly 300 of FIGS. 3A-3B; however, the tape head assembly 500 comprises two tape heads 304, 504 and one or more steps 508a, 508b disposed on the trailing edge (TE) of the substrate 302. The symmetry of tape heads 304 and 504, as well as the steps 308 and 508, permits the tape to operate in both directions. The substrate 302 comprises the first and second steps 308a, 308b disposed on the LE. The first tape head 304 extends about the MFS of the substrate 302, and is surrounded by the recessions 306. The second tape head 504 is disposed closer to the TE, and extends about the MFS of the substrate 302 the same distance as the first tape head 304. The second tape head 504 is surrounded by recessions 506, which have the same dimensions as the recessions 306 discussed above. The TE of the substrate 302 comprises a third step 508a and a fourth step 508b. The third step 508a has the same dimensions as the first step 308a, and the fourth step 508b has the same dimensions as the second step 306b.

During operation, as the tape 310 moves over the sub-strate 302 and tape heads 304, 504, air pressurizes at the first and second steps 308a, 308b, causing the tape 310 to raise over the steps 308a, 308b and the first tape head 304 to prevent the tape 310 from contacting the steps 308a, 308b and the tape head 304. The tape 310 remains lifted over the MFS of the substrate 302 while the tape 310 moves over the substrate 302, and is spaced from the second tape head 504 a distance of about 10 nm to about 30 nm. The third and fourth steps 508a, 508b pressurizes the air around the second tape head 504 to prevent the tape 310 from contacting the second tape head 504. The tape heads 304, 504 are able to continue to write data to and read data from the tape 310 when the tape 310 is spaced from the tape heads 304, 504.

Therefore, by including two or more steps at the leading edge and/or trailing edge of a substrate of a tape head assembly, and by extending one or more tape heads above a MFS of the substrate, the tape head assembly is able to write data to and read data from a tape in both directions and without contacting the tape. Because the tape is spaced from the substrate and the tape head(s), the tape is not damaged by corners of the substrate and/or tape head or by wear and friction. As such, the reliability of the tape is extended while realizing a higher recording density. Moreover, the lifetime of the tape is extended.

In one embodiment, a tape head assembly comprises a substrate, the substrate having a leading edge, a trailing edge, and a first media facing surface (MFS) disposed between the leading edge and the trailing edge, a recession disposed in the substrate, the recession being recessed from the first MFS, a tape head disposed in the recession, the tape head comprising a plurality of data elements, wherein a second MFS of the tape head extends above the first MFS a distance of about 20 nm to about 200 nm, and a first step disposed in the leading edge.

The recession is recessed a distance of about 10 nm to about 100 nm from the first MFS. The tape head assembly further comprises a second step disposed adjacent to the first step in the leading edge, wherein first step comprises a first surface extending in a first direction perpendicular to the first MFS, a second surface extending in a second direction parallel to the MFS, and a third surface extending in the first direction, and wherein the second step comprises the third surface, a fourth surface extending in the second direction, and a fifth surface extending in the first direction, wherein the fifth surface extends to the first MFS. The first surface has a height of about 1 mm, the second surface has a width of about 25 μm to about 100 μm, and the third surface has a height of about 100 nm to about 1000 nm, and wherein the fourth surface has a width of about 25 μm to 100 μm, and the fifth surface has a height of about 100 nm to 2000 nm. The first step has a width to depth ratio of about 80. The recession has a width in the second direction of about 30 μm to about 40 μm. The tape head assembly further comprises a second step disposed adjacent to the first step in the leading edge, wherein the second step has a width to depth ratio of about 40.

A tape drive comprises the tape head assembly, a tape, and means for moving the tape over the tape head assembly. The tape is spaced from the first MFS and the second MFS as the tape is moved over the tape head assembly. The tape is spaced a distance of about 10 nm to about 30 nm from the second MFS, and wherein the tape is spaced a distance of about 50 nm to about 250 nm from the first MFS.

In another embodiment, a tape head assembly comprises a substrate, the substrate having a leading edge, a trailing edge, and a first media facing surface (MFS) disposed between the leading edge and the trailing edge, a first recession disposed in the substrate, the first recession being recessed a distance of about 10 nm to about 100 nm from the first MFS, a first tape head disposed in the first recession, the first tape head comprising a first plurality of data elements, wherein a second MFS of the first tape head extends above the first MFS a distance of about 20 nm to about 200 nm, a first step disposed in the leading edge, the first step comprising a first surface extending in a first direction perpendicular to the first MFS, a second surface extending in a second direction parallel to the MFS, and a third surface extending in the first direction, and a second step disposed adjacent to the first step in the leading edge, the second step comprising the third surface, a fourth surface extending in the second direction, and a fifth surface extending in the first direction, wherein the fifth surface extends to the first MFS.

The tape head assembly further comprises a second recession disposed on the substrate spaced from the first recession, the second recession being recessed a distance of about 10 nm to about 100 nm from the first MFS, and a disposed in the second recession, the second tape head comprising a second plurality of data elements, wherein a third MFS of the second tape head extends above the first MFS a distance of about 20 nm to about 200 nm. The tape head assembly further comprises a third step disposed on the trailing edge, the third step comprising a sixth surface extending in the first direction, a seventh surface extending in the second direction, and an eighth surface extending in the first direction, and a fourth step disposed adjacent to the third step on the trailing edge, the fourth step comprising the eighth surface, a ninth surface extending in the second direction, and a tenth surface extending in the first direction, wherein the tenth surface extends to the first MFS. The first and sixth surfaces each has a height of about 1 mm, the second and seventh surfaces each has a width of about 25 μm to about 100 μm, and the third and eighth surfaces each has a height of about 100 to about 1000 nm. The fourth and ninth surfaces each has a width of about 25 μm to about 100 μm, and the fifth and tenth surfaces each has a height of about 100 nm to about 2000 nm. A tape drive comprises the tape head assembly, a tape, and means for moving the tape over the tape head assembly. The tape is spaced from the first MFS a distance of about 100 nm to about 250 nm as the tape is moved over the tape head assembly, and wherein the tape is spaced from the second MFS a distance of about 10 nm to about 30 nm.

In yet another embodiment, a tape drive comprises a tape, a tape head assembly, the tape head assembly comprising: a substrate, the substrate having a leading edge, a trailing edge, and a first media facing surface (MFS) disposed between the leading edge and the trailing edge, a recession disposed in the substrate, the recession being recessed from the first MFS, the recession being recessed a distance of about 10 nm to about 100 nm from the first MFS, a tape head disposed in the recession, the tape head comprising a plurality of data elements, wherein a second MFS of the tape head extends above the first MFS a distance of about 20 nm to about 200 nm, a first step disposed in the leading edge, the first step having a width to depth ratio of about 80, and a second step disposed adjacent to the first step in the leading edge, the second step having a width to depth ratio of about 40, and a controller configured to move the tape over the tape head and to control the plurality of data elements to write data to and read data from the tape, wherein the tape is spaced from the first MFS a distance of about 50 nm to about 250 nm as the tape is moved over the tape head assembly, and wherein the tape is spaced from the second MFS a distance of about 10 nm to about 30 nm.

The width of the recession can be greater, equal or smaller than the width of the tape head. The tape drive further comprises a third step disposed on the trailing edge, and a fourth step disposed adjacent to the third step on the trailing edge. The third step has a width to depth ratio of about 80, and wherein the fourth step has a width to depth ratio of about 40.

While the foregoing is directed to embodiments of the present disclosure, other and further embodiments of the disclosure may be devised without departing from the basic scope thereof, and the scope thereof is determined by the claims that follow.

What is claimed is:

1. A tape head assembly, comprising:
a substrate, the substrate having a leading edge, a trailing edge, and a first media facing surface (MFS) disposed between the leading edge and the trailing edge;
a recession disposed in the substrate, the recession being recessed from the first MFS;
a tape head disposed in the recession, the tape head comprising a plurality of data elements, wherein a second MFS of the tape head extends above the first MFS a distance of about 20 nm to about 200 nm; and
a first step disposed in the leading edge.

2. The tape head assembly of claim 1, wherein the recession is recessed a distance of about 10 nm to about 100 nm from the first MFS.

3. The tape head assembly of claim 1, further comprising a second step disposed adjacent to the first step in the leading edge, wherein the first step comprises a first surface extending in a first direction perpendicular to the first MFS, a second surface extending in a second direction parallel to the first MFS, and a third surface extending in the first direction, and wherein the second step comprises the third surface, a fourth surface extending in the second direction, and a fifth surface extending in the first direction, wherein the fifth surface extends to the first MFS.

4. The tape head assembly of claim 3, wherein the first surface has a height of about 1 mm, the second surface has a width of about 25 μm to about 100 μm, and the third surface has a height of about 100 nm to about 1000 nm, and wherein the fourth surface has a width of about 25 μm to about 100 μm, and the fifth surface has a height of about 100 nm to about 2000 nm.

5. The tape head assembly of claim 1, wherein the first step has a width to depth ratio of about 80.

6. The tape head assembly of claim 1, wherein the recession has a width in a second direction parallel to the first MFS of about 30 μm to about 40 μm.

7. The tape head assembly of claim 1, further comprising a second step disposed adjacent to the first step in the leading edge, wherein the second step has a width to depth ratio of about 40.

8. A tape drive, comprising:
the tape head assembly of claim 1;
a tape; and
means for moving the tape over the tape head assembly.

9. The tape drive of claim 8, wherein the tape is spaced from the first MFS and the second MFS as the tape is moved over the tape head assembly.

10. The tape drive of claim 9, wherein the tape is spaced a distance of about 10 nm to about 30 nm from the second MFS, and wherein the tape is spaced a distance of about 50 nm to about 250 nm from the first MFS.

11. A tape head assembly, comprising:
a substrate, the substrate having a leading edge, a trailing edge, and a first media facing surface (MFS) disposed between the leading edge and the trailing edge;
a first recession disposed in the substrate, the first recession being recessed a distance of about 10 nm to about 100 nm from the first MFS;
a first tape head disposed in the first recession, the first tape head comprising a first plurality of data elements, wherein a second MFS of the first tape head extends above the first MFS a distance of about 20 nm to about 200 nm;

a first step disposed in the leading edge, the first step comprising a first surface extending in a first direction perpendicular to the first MFS, a second surface extending in a second direction parallel to the first MFS, and a third surface extending in the first direction; and a second step disposed adjacent to the first step in the leading edge, the second step comprising the third surface, a fourth surface extending in the second direction, and a fifth surface extending in the first direction, wherein the fifth surface extends to the first MFS.

12. The tape head assembly of claim 11, further comprising:

a second recession disposed in the substrate spaced from the first recession, the second recession being recessed a distance of about 10 nm to about 100 nm from the first MFS; and a second tape head disposed in the second recession, the second tape head comprising a second plurality of data elements, wherein a third MFS of the second tape head extends above the first MFS a distance of about 20 nm to about 200 nm.

13. The tape head assembly of claim 12, further comprising:

a third step disposed on the trailing edge, the third step comprising a sixth surface extending in the first direction, a seventh surface extending in the second direction, and an eighth surface extending in the first direction; and a fourth step disposed adjacent to the third step on the trailing edge, the fourth step comprising the eighth surface, a ninth surface extending in the second direction, and a tenth surface extending in the first direction, wherein the tenth surface extends to the first MFS.

14. The tape head assembly of claim 13, wherein the first and sixth surfaces each has a height of about 1 mm, the second and seventh surfaces each has a width of about 25 μm to about 100 μm, and the third and eighth surfaces each has a height of about 100 nm to about 1000 nm.

15. The tape head assembly of claim 13, wherein the fourth and ninth surfaces each has a width of about 25 μm to about 100 μm, and the fifth and tenth surfaces each has a height of about 100 nm to about 2000 nm.

16. A tape drive, comprising:
the tape head assembly of claim 11;
a tape; and
means for moving the tape over the tape head assembly.

17. The tape drive of claim 16, wherein the tape is spaced from the first MFS a distance of about 50 nm to about 250 nm as the tape is moved over the tape head assembly, and wherein the tape is spaced from the second MFS a distance of about 10 nm to about 30 nm.

18. A tape drive, comprising:
a tape;
a tape head assembly, the tape head assembly comprising:
  a substrate, the substrate having a leading edge, a trailing edge, and a first media facing surface (MFS) disposed between the leading edge and the trailing edge;
  a recession disposed in the substrate, the recession being recessed from the first MFS, the recession being recessed a distance of about 10 nm to about 100 nm from the first MFS;
  a tape head disposed in the recession, the tape head comprising a plurality of data elements, wherein a second MFS of the tape head extends above the first MFS a distance of about 20 nm to about 200 nm;
  a first step disposed in the leading edge, the first step having a width to depth ratio of about 80; and
  a second step disposed adjacent to the first step in the leading edge, the second step having a width to depth ratio of about 40; and
a controller configured to move the tape over the tape head and to control the plurality of data elements to write data to and read data from the tape, wherein the tape is spaced from the first MFS a distance of about 50 nm to about 250 nm as the tape is moved over the tape head assembly, and wherein the tape is spaced from the second MFS a distance of about 10 nm to about 30 nm.

19. The tape drive of claim 18, wherein a width of the recession is greater, equal or smaller than a width of the tape head.

20. The tape drive of claim 18, further comprising:
a third step disposed on the trailing edge; and
a fourth step disposed adjacent to the third step on the trailing edge.

21. The tape drive of claim 20, wherein the third step has a depth to width ratio of about 80, and wherein the fourth step has a depth to width ratio of about 40.

\* \* \* \* \*